May 5, 1953     W. H. SILVER ET AL     2,637,260
TRACTOR MOUNTED PLOW

Filed Jan. 18, 1946     2 SHEETS—SHEET 1

INVENTOR.
WALTER H. SILVER
ROBERT E. COX
BY
ATTORNEYS.

May 5, 1953     W. H. SILVER ET AL     2,637,260
TRACTOR MOUNTED PLOW

Filed Jan. 18, 1946     2 SHEETS—SHEET 2

INVENTOR.
WALTER H. SILVER
ROBERT E. COX
BY
ATTORNEYS.

Patented May 5, 1953

2,637,260

UNITED STATES PATENT OFFICE 2,637,260

TRACTOR MOUNTED PLOW

Walter H. Silver and Robert E. Cox, Moline, Ill., assignors to Deere & Company, Moline, Ill., a corporation of Illinois Application January 18, 1946, Serial No. 642,083

8 Claims. (Cl. 97—47.1)

The present invention relates generally to tractor mounted implements and is more particularly concerned with ground working tools such as plows and the like.

The object and general nature of the present invention is the provision of a tractor mounted implement particularly arranged and constructed for quick and easy connection with and disconnection from the tractor. More particularly, it is a feature of this invention to provide a disk plow adapted to be connected with and disconnected from its supporting tractor merely by manipulating two or three parts, which may be done easily and conveniently in a very short period of time.

More specifically, it is an important feature of this invention to provide a quick detachable implement which is supported at its front end on the tractor and at its rear end on a ground wheel, and it is a further feature of this invention to provide a steering connection between the ground wheel and the tractor whereby the outfit may operate satisfactorily along curved terraces and under other conditions where more or less turning is required. Still further, it is a feature of this invention to provide an implement, such as a plow, in which a support or beam structure is provided whereby raising or lowering the front end thereof serves to control the depth of operation and in which articulated parts are provided so that raising the intermediate portion of the support or beam structure, as by the power lift bail or other member on the tractor, serves to raise the ground working tools into a transport position and generally about the rear wheel of the implement as a fulcrum.

It is also a feature of this invention to provide an implement connected at one end with the tractor for lateral swinging movement and raised and lowered by the power lift member on the tractor, with connections especially constructed to accommodate any lateral swinging of the implement relative to the tractor without affecting the action and/or efficiency of the lifting arrangement.

These and other objects and advantages of the present invention will be apparent to those skilled in the art after a consideration of the following detailed description, taken in conjunction with the accompanying drawings, in which:

Figure 3 is a fragmentary view showing the mounting for the rear furrow wheel.

Figure 1:
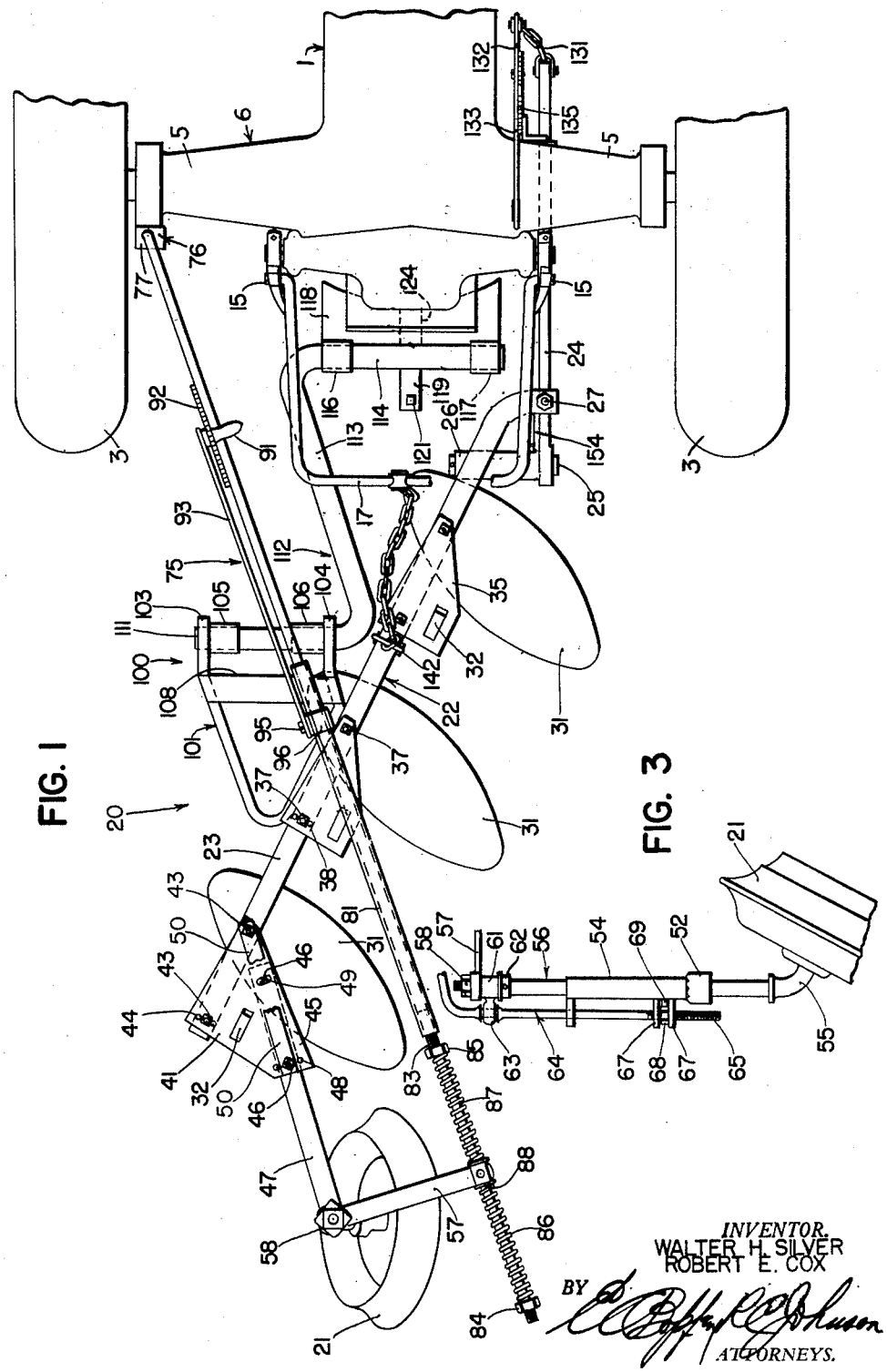
Figure 1 is a plan view of an agricultural implement in which the principles of the present invention have been incorporated.
Figure 2:
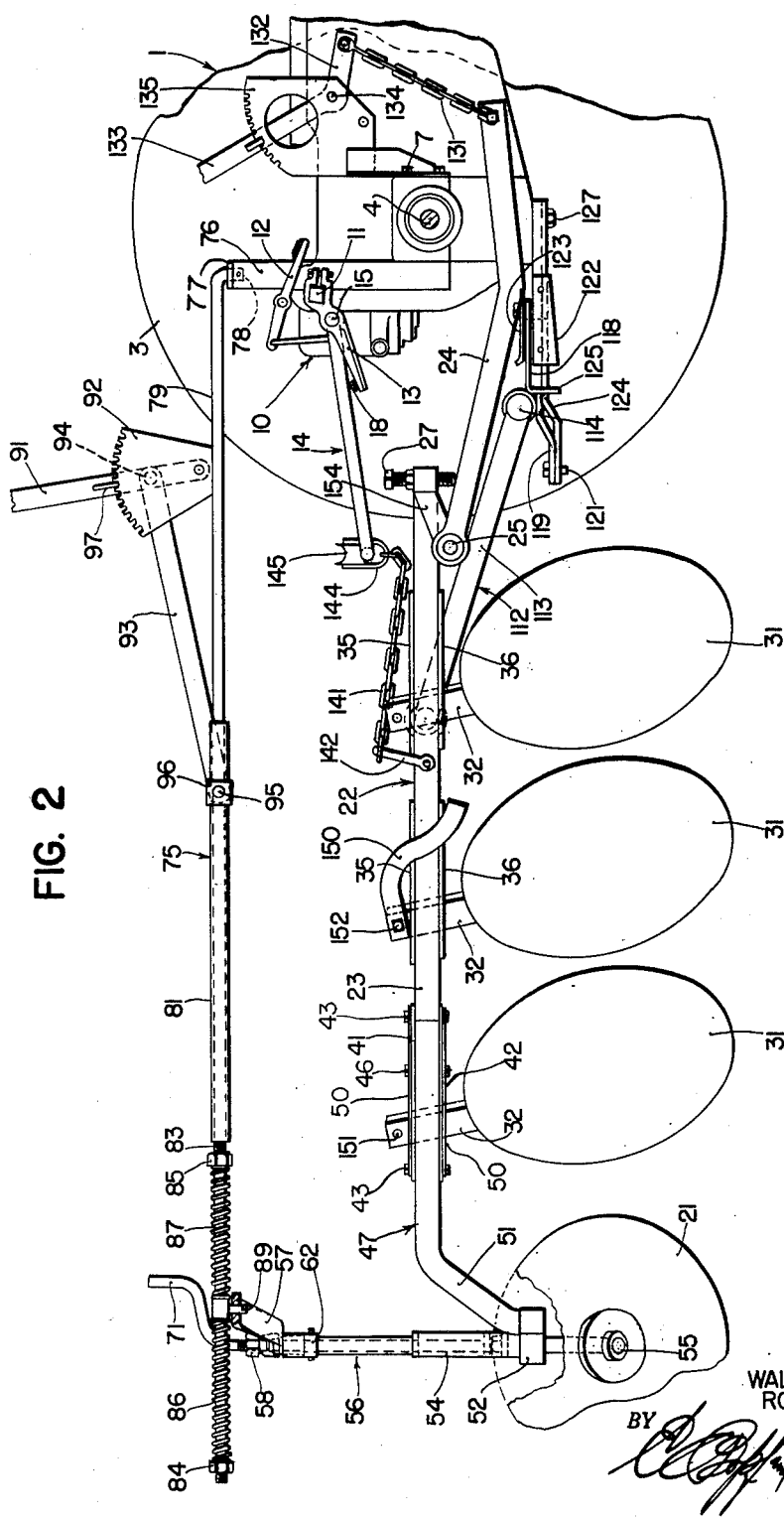
Figure 2 is a side view of the implement shown in Figure 1.

Referring now more particularly to Figures 1 and 2, the tractor is indicated in its entirety by the reference numeral 1 and includes a pair of closely spaced front wheels and a pair of wide spaced rear traction wheels 3 mounted on axle shafts 4 that are carried in extensions 5 forming a part of the rear axle structure 6 of the tractor. The axle structure 6 is secured to or forms a part of the frame of the tractor, and each of the rear axle housing extensions 5 is provided with sets of attaching studs or the like, indicated at 7, that are adapted to receive various implement parts as will be referred to below.

The tractor 1 is provided with a power lift unit indicated in its entirety by the reference numeral 10 and which includes a transverse rockshaft 11 and valve mechanism including a foot operated valve lever 12. The present invention is not particularly concerned with the details per se of the power lift unit, the same being substantially like that shown in the United States Patent 2,107,760, issued February 8, 1938, to E. McCormick et al. to which reference may be made if desired. A power lift arm member 13 is secured to each end of the rockshaft 11 and receives a bail member 14, the side portions of which have outwardly extending trunnion sections 15 received for rocking movement in the power lift arms 13. The bail member 14 is of particular construction, including a rear laterally or transversely extended portion 17, to which more detailed reference will be made below. Adjusting set screws 18 are carried in the rear ends of the power lift arms 13 and serve as adjustable abutments for receiving the bail member 14, as best shown in Figure 2.

The implement in which the principles of the present invention have been incorporated and shown in the accompanying drawings by way of illustration, is indicated in its entirety by the reference numeral 20 and comprises a disk plow having its front end supported on the tractor and its rear end supported on a rear furrow wheel 21. The plow 20 includes a generally longitudinally extending beam structure 22 which comprises a rear or main beam section in the form of a generally diagonally arranged bar 23 and a front or auxiliary beam member 24, the rear end of which is fixed, as by welding, to a short shaft 25 which is mounted for hinging or rocking movement in a sleeve 26 fixed rigidly, as by welding, to the forward end portion of the rear bar 23. The forward end of the bar 23 is extended over the rear end of the bar 24 and is tapped to receive an adjusting screw 27 which forms an abutment for limiting the downward hinging action between the beam members 23 and 24. As illustrated in the drawings, the plow 20 includes three furrow opening disks 31, each mounted on the lower end of a disk standard 32 as by suitable bearing means (not shown). The upper end of each of the two forward disk standards 32 are secured, as by welding, to a pair of upper and lower attachment plates or brackets 35 and 36 which are generally triangular in shape and spaced apart so as to lie on the upper and lower sides of the beam 23. Bolts 37 serve to rigidly fasten the plates 35 and 36 to the beam 23. Preferably, the rear portion of each of the pairs of upper and lower plates 35 and 36 are provided with a plurality of apertures 38 whereby the angular position of the disks 31 may be varied to secure the desired width of cut.

The rearmost disk standard 32 is secured, as by welding, to a pair of upper and lower plates 41 and 42 which, like the plates 35 and 36 mentioned above, are spaced apart to receive the beam bar 23 therebetween. The plates 41 and 42 are apertured to receive bolts 43, and the rear portions of the plates 41 and 42 are provided with a plurality of apertures 44 to provide for adjusting the angular position of the rearmost disk 31. The plates 41 and 42 are extended rearwardly to provide portions 45 which are apertured to receive bolts 46 that fasten a rear furrow wheel bracket 47 to the rear bracket plates 41 and 42. The plates 41 and 42 are provided with a plurality of apertures 48 at the rear corner and a slot 49 in the forward portion to provide for adjusting the angular position of the bracket 47 relative to the plates 41 and 42, which is necessary whenever the plates 41 and 42 are shifted about the front bolt 43 as a pivot on the beam 23, and in order to provide for swinging the bar 47 about the same pivot, the bolts 46 are carried in upper and lower pivot straps 50.

The bar or bracket 47 is shaped, as best shown in Figure 2, to provide a downwardly extending portion 51 to which a yoke 52 is secured, as by welding, the yoke 52 being secured as by welding, to a spindle-receiving sleeve 54. The rear furrow wheel 21 is journaled for rotation on the laterally outwardly and downwardly turned portion 55 of a vertical furrow wheel spindle 56. The upper end of the spindle 56 is squared or otherwise formed to non-rotatably receive a steering arm 57, preferably secured in place by a locknut 58. Below the arm 57 is a swivel 61 held in place by a collar 62 on the spindle 56 below the swivel 61. The swivel 61 includes an eye section 63 which receives the upper portion of an adjusting crank 64, the lower end of which is threaded, as at 65, and extends through a pair of apertured lugs 67 between which a nut member 68 is disposed. The nut member 68 is provided with an extension 69 which contacts the sleeve 54 to prevent the nut from rotating when the adjusting crank screw 64 is turned, which may easily be done by manipulating the upper handle section 71 thereof.

A steering link construction 75 is connected between the outer end of the arm 57 and a point on the tractor at one side of the central portion thereof. The steering linkage preferably comprises a bracket 76, which may take the form of an angle, secured to the left hand axle extension 5 and having an upper apertured lug 77 which receives the forward downturned end 78 of a forward rod member 79. The rear end of the latter is slidably received in a rear tubular section 81 which at its rear end is secured to a rear threaded section 83. The latter section carries a pair of adjusting nuts 84 and 85 between which compression springs 86 and 87 are disposed. The adjacent ends of the springs 86 and 87 bear against a swivel 88 that is pivotally connected, as at 89 (Figure 2), to the outer end of the steering arm 57. The springs 86 and 87 provide a cushioning action whereby irregularities in the ground do not impart excessive vibration and/or loads to the tractor. The link construction 75 may be adjusted in effective length by sliding the member 81 along the member 79, which may be done by means of an adjusting lever 91 that is pivoted to a section 92 fixed to the rod 79. A link 93 is pivotally connected, as at 94, to the lever 91 and at its rear end is pivotally connected, as at 95, to a collar 96 that is fastened in any suitable way, as by welding, to the forward end of the tubular member 81. The lever 91 is provided with suitable detent mechanism 97 so that when the lever 91 is locked to the sector 92, the effective length of the linkage 75 is held in adjustment, the linkage 75 serving to steer the rear furrow wheel 21 whenever the implement 20 swings laterally about a vertical axis relative to the tractor.

The hitch construction providing for the above mentioned quick detachability and also the above mentioned lateral swinging will now be described.

The hitch mechanism connecting the plow beam 22 and associated parts to the tractor 1 is indicated in its entirety by the reference numeral 100 and comprises a rear bracket member 101, preferably in the form of a U-shaped yoke secured, as by bolts or the like, to the beam 23 and having forward apertured lug sections 103 and 104, each of which has a bushing or sleeve section 105 and 106 secured thereto, as by welding, together with a rigid draft member 112 and means, referred to below in detail, for hingedly connecting the forward end of the rigid member 112 with the tractor. The forward portions 103 and 104 of the bracket 101 are reenforced by a cross brace 108. The bushings or sleeves 105 and 106, and the corresponding openings in the lugs 103 and 104, receive the rear laterally turned end 111 of the above-mentioned rigid draft member 112, which preferably is of generally Z-shaped configuration having an intermediate section 113 connecting the rear section 111 with a forward laterally directed section 114. The forward lateral section 114 of the rigid draft member 112 is received in a pair of sleeve sections 116 and 117 that are secured, as by welding, to a mounting plate 118 (Figure 2), which plate also has rigidly secured thereto a hitch bar section 119 the rear end of which is apertured to receive a quick detachable member 121, the sleeve sections 116 and 117, the mounting plate 118, and the section 119 constituting the above-mentioned means for hingedly connecting the forward end of the rigid member 112 with the tractor, these parts being connected, as at 121, with the laterally swingable tractor drawbar 124 thus also forming means providing for lateral swinging of the draft member 112, and the plow as a whole, relative to the tractor. The tractor 1 is provided with a hitch-receiving structure which comprises a drawbar support 122, an upper plate 123 that is spaced from the drawbar support 122 to receive the hitch plate 118 therebetween, and a laterally swingable drawbar member 124 which has its rear end apertured to receive the hitch pin 121 and which, in turn, is received within a notch formed in the downturned portion 125 of the attaching or hitch plate 118. It will be seen that by virtue of the one connecting pin 121 the implement hitch structure is connected with the tractor to swing about a vertical axis, defined by a pivot member 127 that connects the forward end of the tractor drawbar 124 with the tractor body. However, the implement may swing vertically relative to the tractor by virtue of the pivotal connection on the rear end of the rigid draft member 112 with the plow beam bracket 101 and also by virtue of the pivotal connection between the forward end of the rigid draft member 112 and the attachment plate sleeve sections 116 and 117.

The particular details of a hitch construction of this kind is disclosed and claimed in our co-pending application, Serial No. 566,539, filed December 4, 1944, now Patent No. 2,604,834.

The front end of the forward beam member 24 is connected by a chain 131 to an arm 132 that is formed on or carried by a depth adjusting lever 133. The lever 133 is pivotally mounted, as at 134, on a sector bracket 135 which is secured, as by the above mentioned studs 7, to the forward side of the right hand axle housing extension 5. Swinging the lever 133 in one direction or the other acts through the chain 131 to raise or lower the front end of the beam structure 22. However, the chain 131, being a flexible element, and further, being connected to the bar 24 fairly close to the pivot 127, lateral swinging of the implement toward one side or the other of the tractor has little effect so far as the depth of operation is concerned.

The operation of the implement described above is substantially as follows.

Figure 2 shows the implement arranged in operating position, and it will be noted that the main draft load is transmitted from the tractor to the implement through the rigid draft member 112 that is hingedly connected to the tractor and the implement for movement relative thereto about transverse axes. Also, it will be noted that this member 112 is arranged in a downwardly and forwardly extending position, whereby there is a downward component of the draft force which serves to hold the disks 31 to their work. This downwardly directed force component is also adapted to hold the beam members 23 and 24 in rigid relation, the abutment 27 serving to limit the downward displacement of the beam sections 23 and 24 under the effects of the downwardly directed force component just mentioned. The front end of the member 24 tends to move downwardly but is held in position by the chain 131 and the depth adjusting lever 133. The rear furrow wheel 21 is normally placed so that it is on the level with the rear disk 31. Since the implement is capable of swinging laterally about the axis defined by the pivot bolt 127, when the implement does swing laterally it is desired to steer the rear furrow wheel 21, and that is accomplished by the steering linkage 75 which, as mentioned above, is connected with the tractor generally at one side of the vertical axis through the pivot bolt 127. The position of the rear furrow wheel 21 in a vertical direction relative to the disks 31 may be adjusted by turning the crank 71.

The implement may be raised into a transport position by operating the tractor power lift valve arm 12, which acts through the rockshaft 11 and the arms 13 to swing the bail 14 upwardly from the position shown in Figure 2. In order to lift the implement, we provide a chain 141 which is connected at its lower end by a shackle 142 with the forward portion of the beam 23. At its upper end the chain 141 is connected by a swivel 144 to a roller 145 which operates along the rear transverse section 17 of the power lift bail 14. Since the roller 145 may occupy different positions laterally along the rear portion 17 of the bail 14, it will be seen that the plow may be raised and lowered from substantially any lateral position which the plow may occupy with respect to the tractor at the moment it is desired to lift the same. When the bail member 14 swings upwardly, the chain 141, which normally is slack in operation, tightens and raises the forward end of the bar 23, lifting the furrow openers 31 out of contact with the ground and swinging the rear beam section 23 upwardly, generally about the rear furrow wheel 21 as a fulcrum. It will be noted that in this action the front bar 24 merely swings down idly away from the front end of the bar 23, moving out of contact with the abutment 27.

Preferably, the disk furrow openers 31 are provided with scrapers, but since the scrapers are of conventional construction they have not been illustrated in the drawings. Preferably, each scraper is mounted on a scraper bracket 150 which may be secured, as by a bolt 152, to the upper end of each of the disk standards 32, the latter having apertures 151 for that purpose. For purposes of clarity, only one of the scraper brackets 150 is shown in the drawings. The sleeve section 26 receiving the stub shaft 25 to which the rear end of the forward beam bar 24 is secured, is reenforced by a brace 154.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A plow adapted to be mounted at one end on a tractor having a laterally shiftable hitch-receiving means, said plow comprising a generally longitudinally extending beam, a rear furrow wheel connected with the rear end of said beam for movement relative thereto about a generally vertical axis, furrow opener means carried by the rear portion of said beam forwardly of said rear furrow wheel, hitch means extending between an intermediate portion of said beam and the laterally shiftable hitch-receiving means of the tractor and providing for lateral swinging of the implement relative to the tractor about a generally vertical axis, said hitch means including a rigid member and front and rear means for hingedly connecting the front and rear end portions of said rigid member with said beam and said hitch-receiving means of the tractor, respectively, for relative movement about transverse axes, means adapted to act between the front hinged connecting means and the tractor for preventing lateral tilting of the plow beam and associated parts relative to the tractor about a generally fore-and-aft extending axis, lifting means connected with the front end of said beam for raising and lowering the latter to control the depth of plowing, said hitch member being movable about the axes of its hinged connection with the beam and the hitch-receiving means of the tractor, respectively, and a steering link connection between said rear furrow wheel and one side of the tractor.

2. A semi-integral disk plow adapted to be connected with a tractor having a laterally swingable drawbar, said plow comprising a plow beam structure including a rear section and a front section hingedly connected for movement relative thereto about a generally transverse axis, a rear furrow wheel connected with the rear end of the rear section, means acting between said sections for limiting the downward movement of the front end of the rear section relative to the front section, means adapted to be mounted on the tractor at one side thereof and engageable with the front end of the front section for raising and lowering the front end of the latter so as to control the depth of operation of the furrow openers, a draft transmitting connection hingedly connected with the intermediate portion of the rear plow beam section for movement relative thereto about a transverse axis, a part hingedly connected with said draft-transmitting connection for movement relative thereto about a transverse axis and adapted to be fixedly connected to the tractor drawbar and thereby swingable laterally, relative to the tractor, with said drawbar about a generally vertical axis, and a steering connection between the other side of the tractor and the rear furrow wheel.

3. A tractor mounted plow comprising frame means including a generally diagonally extending beam having furrow openers thereon, a draft bracket fixed to the generally intermediate portion of said beam rearwardly of certain of said furrow openers and extending forwardly from the forward side of the beam, and a generally Z-shaped rigid draft member having a rear laterally outwardly extending portion journalled for pivoting movement in the forward portion of said bracket and having a forward portion extending laterally oppositely relative to said rear laterally extending portion and adapted to be hingedly connected for generally vertical swinging movement with the tractor, and a forwardly extending part pivotally connected at its rear end to the forward portion of said beam and adapted to be connected at its front end with the tractor for adjusting the depth of operation of said furrow openers, said beam having at its forward end a part engageable with said forwardly extending part for limiting the relative movement in one direction between said beam and said forwardly extending part.

4. A tractor mounted plow comprising frame means including a generally diagonally extending beam having furrow opening means thereon, a draft bracket fixed to said beam and extending generally forwardly at one side of said diagonally extending beam, said draft bracket comprising a generally U-shaped member having forwardly extending apertured ends and interconnected side sections one of which is shaped to lie against one side of said diagonally extending beam, means for securing said side section to said side of the diagonal beam, the forward apertured portion of said side section being spaced from said beam, and a generally Z-shaped rigid draft member having a rear laterally extending portion journaled for pivoting movement in the forward apertured ends of said bracket, a central forwardly extending section having its rear portion joined to the inner end of said rear laterally extending portion and lying in the space between said beam and the apertured portion of said side section of said U-shaped draft bracket, and a forward laterally extending portion disposed generally parallel to said rear laterally extending portion and adapted to be hingedly connected for generally vertical swinging movement with the tractor.

5. A tractor mounted plow comprising frame means including a generally diagonally extending beam having furrow opening means thereon, a steerable rear furrow wheel, a supporting section disposed furrowwardly at the rear end of said beam for connecting said wheel therewith, a draft bracket fixed to the intermediate portion of said beam and extending generally forwardly at the landward side of said diagonally extending beam, a generally Z-shaped rigid draft member having a rear landwardly extending portion journaled for pivoting movement in said bracket and having a forward portion extending furrowwardly and adapted to be hingedly connected for generally vertical swinging movement with the tractor, a furrowwardly extending arm connected to turn said rear steerable wheel, means adapted to be carried at the furrowward side of the tractor and connected with the forward end of said diagonal beam for raising and lowering the latter to adjust the working depth of said furrow opening means, and a steering link connected at its rear portion with said steering arm and extending diagonally forwardly across said beam and connected with the landward side of the tractor, whereby turning of the tractor relative to said beam turns said rear steerable wheel.

6. A tractor mounted plow adapted to be connected with a tractor having a laterally swingable part, said plow comprising a main plow beam section and a forward auxiliary beam section hingedly connected together for movement about a transverse axis, adjustable leveling means carried by said main beam section and engageable with the auxiliary beam section for limiting the upward movement thereof about said axis relative to said main plow beam section, thereby leveling the plow in a fore and aft direction, a rear furrow wheel connected to the rear end of said main beam section, a rigid draft member hingedly connected with the tractor and with the main beam section and movable relative to both about transverse axes, means for connecting said rigid draft member with the laterally swingable part of the tractor so as to be pivotally connected with the latter for lateral movement about a generally vertical axis, means engageable with the front end portion of said auxiliary beam section for adjusting the depth of operation of the plow, said last mentioned means including a generally vertically suspended part accommodating the lateral movement of the plow about said vertical axis, and means adapted to be carried on the tractor and engageable with one of said beam sections adjacent the hinged connection between said sections for raising the plow about said rear furrow wheel as a fulcrum.

7. A tractor mounted plow comprising a generally longitudinally extending beam section, a draft connection between the generally intermediate portion of said beam section and the tractor, an auxiliary beam member pivotally connected at its rear end with the forward portion of said beam section rearwardly of the front end thereof and extending at its forward end alongside a portion of the tractor, abutment means carried by the front end of said beam section and overhanging the rear portion of said forwardly extending auxiliary beam member and serving as a stop for limiting the downward movement of the forward portion of said beam section relative to said forwardly extending auxiliary beam member, lifting means connected with said beam section rearwardly of the rear end of said auxiliary beam member, and means adapted to be mounted on the tractor and connected with the forward end of said forwardly extending auxiliary beam member for raising and lowering the latter so as to control the depth of operation of the plow.

8. A plow adapted to be mounted at its front end on a tractor, comprising a generally longitudinally extending beam structure, a rear furrow wheel connected with the rear end of said beam structure for movement relative thereto about a generally vertical axis, furrow opener means carried by said beam structure forwardly of said rear furrow wheel, hitch means extending between said beam structure and the tractor for lateral swinging of the plow relative to the tractor about a generally vertical axis, means for hingedly connecting said hitch means with said beam structure and with said tractor, said hitch means being rigid, whereby the latter serves to prevent lateral tilting of the beam structure and associated parts relative to the tractor, lifting means connected to act against the front portion of said beam structure for raising and lowering the latter to control the depth of plowing, said hitch means moving about the axes of its hinged connections with said beam structure and the tractor, respectively, when said lifting means is actuated, and a steering link connection between said rear furrow wheel and one side of the tractor.

WALTER H. SILVER.
ROBERT E. COX.

References Cited in the file of this patent

UNITED STATES PATENTS

| Number | Name | Date |
|---|---|---|
| 1,200,107 | Heylman | Oct. 3, 1916 |
| 1,330,198 | Lindley | Feb. 10, 1920 |
| 1,479,994 | Krotz | Jan. 8, 1924 |
| 1,916,945 | Ferguson | July 4, 1933 |
| 1,918,730 | Willson et al. | July 18, 1933 |
| 1,928,961 | Brown | Oct. 3, 1933 |
| 1,965,927 | Mahan | July 10, 1934 |
| 2,077,942 | Lindgren | Apr. 20, 1937 |
| 2,097,841 | Park | Nov. 2, 1937 |
| 2,098,472 | Strandlund | Nov. 9, 1937 |
| 2,132,166 | Hester | Oct. 4, 1938 |
| 2,172,983 | Morkoski | Sept. 12, 1939 |
| 2,182,020 | Fleck | Dec. 5, 1939 |
| 2,271,533 | Altgelt | Feb. 3, 1942 |
| 2,307,980 | Avrett | Jan. 12, 1943 |
| 2,320,141 | Kott | May 25, 1943 |
| 2,406,484 | Allen | Aug. 7, 1946 |
| 2,409,228 | Silver | Oct. 15, 1946 |
| 2,410,945 | Johnson et al. | Nov. 12, 1946 |
| 2,412,362 | Silver | Dec. 10, 1946 |

FOREIGN PATENTS

| Number | Country | Date |
|---|---|---|
| 189,998 | Great Britain | Dec. 14, 1922 |
| 302,345 | Italy | Oct. 25, 1932 |